(12) United States Patent
Scott et al.

(10) Patent No.: US 9,201,689 B2
(45) Date of Patent: Dec. 1, 2015

(54) SOFTWARE EMULATION OF MASSIVE HARDWARE THREADING FOR TOLERATING REMOTE MEMORY REFERENCES

(75) Inventors: Steven L. Scott, Eau Claire, WI (US); Gregory B. Titus, Albuquerque, NM (US); Sung-Eun Choi, Kirkland, WA (US); Troy A. Johnson, Eagan, MN (US); David Mizell, Sammamish, WA (US); Michael F. Ringenburg, Seattle, WA (US); Karlon West, Pflugerville, TX (US)

(73) Assignee: Cray Inc., Seattle, WA (US)

( * ) Notice: Subject to any disclaimer, the term of this patent is extended or adjusted under 35 U.S.C. 154(b) by 463 days.

(21) Appl. No.: 13/092,822

(22) Filed: Apr. 22, 2011

(65) Prior Publication Data

US 2012/0272247 A1    Oct. 25, 2012

(51) Int. Cl.
G06F 9/455    (2006.01)
G06F 9/46    (2006.01)
G06F 9/48    (2006.01)

(52) U.S. Cl.
CPC ........ *G06F 9/4881* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 5,613,071 A * | 3/1997 | Rankin | G06F 12/0284 |
| 5,872,963 A * | 2/1999 | Bitar et al. | 712/233 |
| 2004/0244003 A1* | 12/2004 | Perfetto | G06F 9/4881 718/100 |
| 2005/0125802 A1* | 6/2005 | Wang et al. | 718/108 |
| 2005/0210470 A1* | 9/2005 | Chung | G06F 9/505 718/100 |
| 2008/0040578 A1* | 2/2008 | Kang | G06F 9/3851 712/205 |
| 2008/0201716 A1* | 8/2008 | Du | G06F 9/30145 718/104 |
| 2011/0145626 A2* | 6/2011 | Frank et al. | 714/2 |

OTHER PUBLICATIONS

Buntinas et al., "Optimizing synchronization operations for remote memory communication systems," Apr. 2003, Parallel and Distributed Processing Symposium, Proceedings. International, pp. 22-26.*
Mellor-Crummey, J. M., et al., "Algorithms for Scalable Synchronization on Shared-Memory Multiprocessors," ACM Transactions on Computer Systems, vol. 9, No. 1, Feb. 1991, 42 pages.
Michael, M. M., et al., "Simple, Fast, and Practical Non-Blocking and Blocking Concurrent Queue Algorithms," Proceedings of the Fifteenth Annual ACM Symposium on Principles of Distributed Computing, 1996, 9 pages.

(Continued)

*Primary Examiner* — Abdullah Al Kawsar
*Assistant Examiner* — Melissa Alfred
(74) *Attorney, Agent, or Firm* — Perkins Coie LLP

(57) ABSTRACT

A method and system for software emulation of hardware support for multi-threaded processing using virtual hardware threads is provided. A software threading system executes on a node that has one or more processors, each with one or more hardware threads. The node has access to local memory and access to remote memory. The software threading system manages the execution of tasks of a user program. The software threading system switches between the virtual hardware threads representing the tasks as the tasks issue remote memory access requests while in user privilege mode. Thus, the software threading system emulates more hardware threads than the underlying hardware supports and switches the virtual hardware threads without the overhead of a context switch to the operating system or change in privilege mode.

25 Claims, 14 Drawing Sheets

(56) References Cited

OTHER PUBLICATIONS

Patterson, David A. et al., "Computer Organization and Design", 4th ed. Morgan Kaufman Publishers, 2009, 4 pages.

Wang, Perry H. et al., "Helper Threads Via Virtual Multithreading on an Experimental Itanium 2 Processor-based Platform," ASPLOS '04, Oct. 9-13, 2004, pp. 144-155.

Wang, Perry H., et al., "Helper Threads Via Virtual Multithreading," IEEE Computer Society, Nov.-Dec. 2004, pp. 74-82.

* cited by examiner

SOFTWARE EMULATION OF MASSIVE HARDWARE THREADING FOR TOLERATING REMOTE MEMORY REFERENCES

BACKGROUND

Massively parallel processing ("MPP") systems may have tens of thousands of nodes connected via a network interconnect. Each node may include one or more processors (e.g., an AMD Opteron processor or an Intel Xeon with multiple processors), local memory (e.g., between 1-16 gigabytes), and a communications interface (e.g., HyperTransport technology) connected via a network interface controller ("NIC") to routers of the network interconnect. Some of the local memory of each node may be accessible to the processors of the other nodes as shared memory. Thus, a processor of a node can access its own local memory and the shared memory of other nodes, referred to as remote memory for that processor. To access remote memory, a processor needs to send a remote memory access request through the network interconnect to the node where the remote memory is located. In contrast, to access local memory, the processor directly accesses the memory at that node. Because accessing remote memory requires sending a request through the network interconnect, the access time for remote memory is typically much longer than the access time for local memory. In addition, the access time for remote memory may vary considerably as the traffic on the network interconnect varies. For example, if many nodes frequently send memory requests to a single node, then the routes to that node and the shared memory of that node may become congested with a backlog of requests, resulting in increased access times.

Such MPP systems with shared memory are generally well suited for executing programs with significant amounts of parallelism. Certain classes of parallel algorithms, however, may present difficulties for conventional MPP systems because of very poor locality of reference and very little concurrency per thread. For example, such programs may process large amounts of data represented by a graph of vertices connected by edges. Such graphs may include tens of millions of vertices, each of which represents, for example, a web page with the edges representing hyperlinks between the web pages. Such programs distribute the storage of the vertices of the graph across multiple nodes. When such a program executes, the program may specify tasks that can be executed in parallel. The tasks are executed in parallel by the nodes of the system. When a task needs to access a vertex that is stored in remote memory, the task issues a remote memory access request. While this remote memory access request is outstanding, the task waits for the memory request to complete, with the processor performing no useful work.

Some operating systems support multiple threads of execution within a single process in which a program executes. Such an operating system may assign each task of a program to a separate thread. The operating system then controls the scheduling of the execution of the threads. For example, the operating system may select the threads in a round-robin manner and allow the selected thread to execute for no more than a certain time quantum. At the end of the time quantum (or when the executing thread transfers control to the operating system (e.g., an I/O request)), a context switch to the operating system occurs, and the operating system suspends the execution of the currently executing thread and selects another thread for execution. When the suspended thread is again selected for execution, the thread resumes its execution where it left off. To track where a thread left off, the operating system saves and restores the context of the threads (e.g., program counter and registers). Because context switching between one thread and another is performed by the operating system, it may take a considerable amount of time, because of the overhead of saving the state of the thread being suspended, entering and exiting the operating system, and restoring or initializing the state of the thread that is being switched to. In addition, the context switching to the operating system requires changing from a relatively low privilege mode (e.g., user privilege mode) to a high privilege mode (e.g., kernel privilege mode or operating system privilege mode) so that the operating system can access the critical resources (e.g., paging tables) and then back again to the low privilege mode to prevent the user program from accessing those critical resources.

Some parallel computer architectures have processors that facilitate the switching of execution from one thread to another thread, referred to as a multi-threaded processor (e.g., the Cray XMT processor). Each multi-threaded processor has multiple hardware threads and can execute multiple threads simultaneously. (A conventional or non-multi-threaded processor is considered to have only one hardware thread.) Every clock period, the processor selects a hardware thread that is ready to execute and allows it to issue its next instruction. Instruction interpretation may be pipelined by the processor so that the processor can issue a new instruction from a different hardware thread in each clock period without interfering with other instructions that are in the pipeline.

The state of a thread of a multi-threaded processor may comprise the data of a thread status register, some number of general purpose registers (e.g., 128), and other special purpose registers. To reduce the processing overhead of switching between threads at each clock period, a multi-threaded processor may include a complete set of these registers for the maximum number of threads that can be executing simultaneously. As a result, the state of each thread is immediately accessible by the processor without the need to save and restore the registers when an instruction of that thread is to be executed.

Because an MPP system that includes such multi-threaded processors can switch to execute different hardware threads at each clock period, when a hardware thread issues a remote memory access request, the multi-threaded processor can continue executing the next instruction of another hardware thread at the next clock period. Such a processor would not select for execution any thread waiting on a remote memory access. As a result, such multi-threaded processors will continue to perform productive work as long as there is at least one hardware thread that is not waiting on a remote memory access or on some other event (e.g., waiting for exclusive access to a data structure).

Most MPP systems, however, either do not have multi-threaded processors (i.e., only one hardware thread per processor) or do not have enough hardware threads (e.g., only two hardware threads per processor) to hide the latency of remote memory accesses and keep each processor busy when threads make frequent remote memory accesses. The operating systems of such MPP systems are typically responsible for scheduling the threads that are to run on each hardware thread with the resulting overhead in switching to and from the context of the operating system. Moreover, these operating systems do not typically switch threads on remote memory accesses. Thus, programs that have a high degree of parallelism, but frequently access remote memory with very little concurrency per thread, do not perform well on such MPP systems

DETAILED DESCRIPTION

Figure 1:
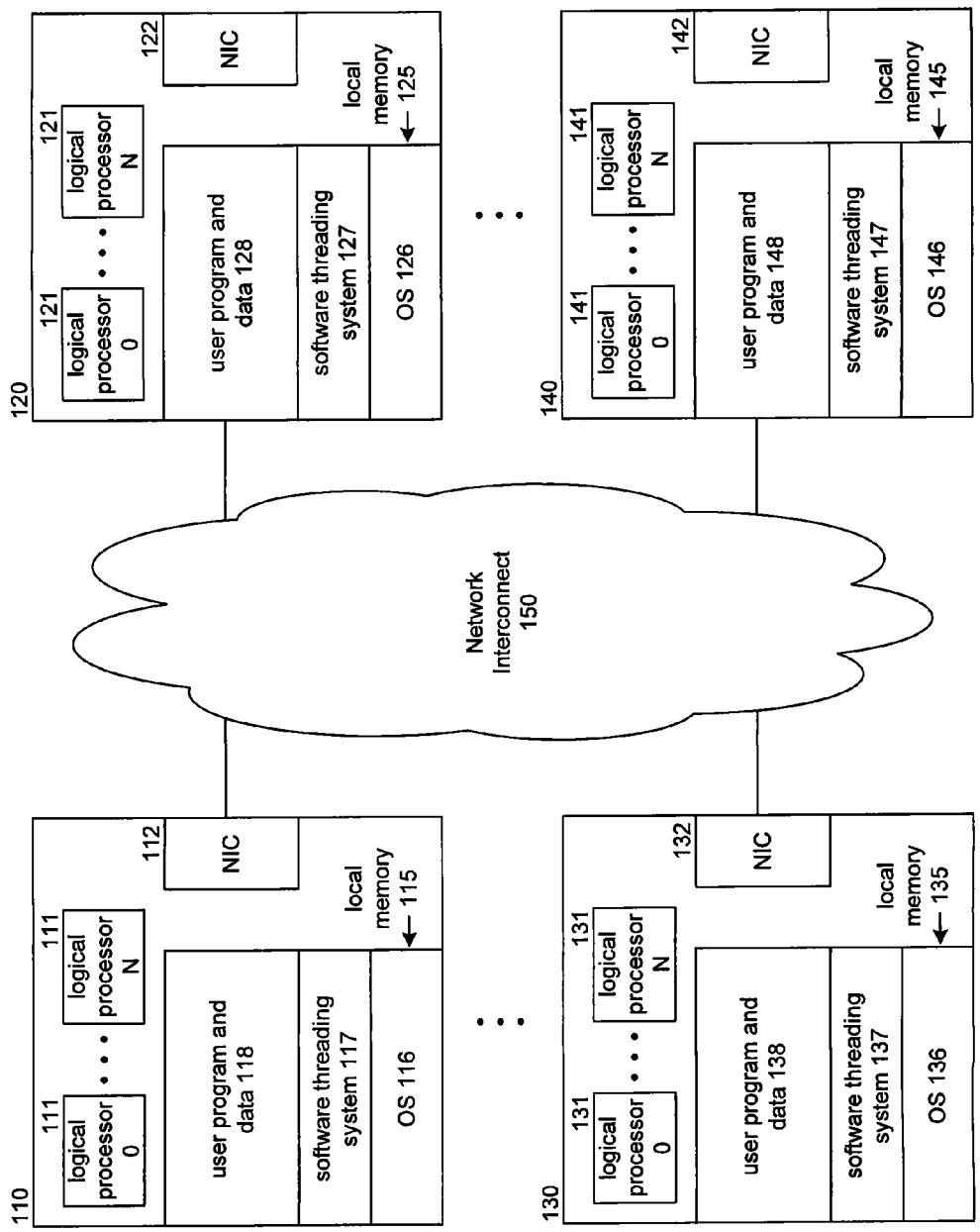
FIG. 1 is a block diagram that illustrates an MPP system for executing a software threading system in some embodiments.

A method and system for software emulation of hardware support for multi-threaded processing is provided. In some embodiments, a software threading system emulates more hardware threads than the actual hardware threads of a processor using "virtual hardware threads." The software threading system represents a virtual hardware thread as a data structure that, like a hardware thread, stores context of a thread. When a user program with multiple tasks executes, the software threading system assigns each task to a virtual hardware thread by setting the context of the virtual hardware thread to the context of the assigned task. The software threading system then selects a virtual hardware thread for execution by an actual hardware thread and switches the context of the actual hardware thread to that of the selected virtual hardware thread. The software threading system may allow the virtual hardware thread to continue its execution until the virtual hardware thread needs to wait for a remote memory access to complete or for some other event to occur before continuing its execution. While a virtual hardware thread waits for an event to occur, the software threading system saves the context of the now-waiting virtual hardware thread in its data structure, selects another virtual hardware thread for execution by the actual hardware thread, and switches the context of that actual hardware thread to the context of the other virtual hardware thread. The other virtual hardware thread then executes so that productive work can be performed by the hardware thread while a virtual hardware thread waits for an event to occur. When the event occurs for which the virtual hardware thread was waiting, the software threading system can then select that virtual hardware thread to resume its execution. Thus, the software threading system improves overall performance by increasing concurrency among the tasks of the user program. In addition, the software threading system preferably executes in the same privilege mode as the user program. As a result, the software threading system avoids the overhead of context switching to the operating system with the corresponding change in privilege mode when switching between virtual hardware threads. The software threading system can thus productively switch between virtual hardware threads when a virtual hardware thread waits for certain events, such as completion of a remote memory access.

The software threading system may execute on a node with a single processor or with multiple processors, and each processor may have only one hardware thread or may have multiple hardware threads. Since a processor is responsible for switching between the execution of its hardware threads, the software threading system considers each hardware thread of a processor to represent a different "logical processor." For example, the software threading system considers a processor with one hardware thread to represent one logical processor and a processor with two hardware threads to represent two logical processors. In the following, the software threading system is described in the context of nodes having one or more logical processors that each corresponds to an actual hardware thread of a processor of the node. The software threading system selects a virtual hardware thread for execution by each logical processor as the current virtual hardware thread for that logical processor, and the actual processors are responsible for selecting between their hardware threads for execution.

The software threading system switches between the virtual hardware threads selected for execution by a logical processor when a task issues a "switchable service" request. A switchable service is a service that needs to be completed before the issuing task can continue execution and where the time needed to complete the service (latency) is long enough for the software threading system to switch the execution of the logical processor from its current virtual hardware thread to another virtual hardware thread while waiting for the switchable service to complete. A switchable service may be, for example, a remote memory access. The software threading system may thus switch between virtual hardware threads whenever a task issues a switchable service request so that the logical processor can continue to perform productive work of another task while one or more tasks wait for their switchable service to complete.

In some embodiments, the software threading system provides an interface through which a user program (i.e., program that executes in user privilege mode) informs the software threading system of the tasks of the user program that can be executed in parallel. For example, a user program may include a parallel execution construct in which a certain function may be executed in parallel as a number of tasks. The software threading system maintains a per-task data structure in a local memory to track the state or context of that task while the task is not assigned to a virtual hardware thread. The software threading system also maintains a per-thread data structure for each virtual hardware thread. After a user program informs the software threading system of its tasks, the software threading system initializes each virtual hardware thread to start executing code to select a task for that virtual hardware thread. When a virtual hardware thread is selected for execution by a logical processor, the software threading system switches the context of the logical processor to that of the virtual hardware thread, selects a task to assign to that virtual hardware thread if not already assigned, and switches context of the logical processor to the assigned task. Alternatively, the software threading system of each virtual hardware thread may be responsible for assigning the first task to the next virtual hardware thread to be selected for execution by a logical processor, or the software threading system of a designated virtual hardware thread may be responsible for assigning the first task for execution by the other virtual hardware threads.

The software threading system switches the current virtual hardware thread selected for execution by a logical processor to a different virtual hardware thread when the task of the current virtual hardware thread waits for a remote memory access to complete so that the logical processor can continue executing a different task while the task waits for the remote memory access to complete. To access remote memory, a task conventionally issues a remote memory access request and performs no useful work while waiting for the access to complete. The software threading system allows the logical processor to continue to perform useful work of another task even while waiting for a remote memory access to complete by dividing the remote memory access into an initiation phase and completion phase. During the initiation phase, the software threading system executes one or more instructions that issue a remote memory access request and then the software threading system continues to execute without waiting for the remote memory access to complete. Although the task assigned to the current virtual hardware thread needs to wait for the remote memory access to complete, the software threading system selects another virtual hardware thread for execution by the logical processor so that the logical processor can perform useful work of another task while the task waits. During the completion phase, the software threading system detects that the remote memory access has completed (e.g., by an interrupt or by polling). The software threading system then allows the task that was waiting on the remote memory access to continue its execution by switching execution of a logical processor to the virtual hardware thread to which that task is assigned.

When a task is to access remote memory, the task invokes the software threading system, passing an indication of the memory location to access. The software threading system then issues the remote memory access request (i.e., the initiation phase), places the virtual hardware thread in a wait state until the remote access request completes, and saves the context of the logical processor in the virtual hardware thread data structure so that the context can be restored when the virtual hardware thread is again selected for execution by a logical processor after the remote memory access completes. (The software threading system may allow for multiple remote memory access requests to be outstanding from a single virtual hardware thread and may indicate when a virtual hardware thread does not need to wait for a remote memory access to complete. In such a case, the remote memory access request does not cause the software threading system to switch to another virtual hardware thread.) The software threading system then selects another virtual hardware thread for execution by the logical processor as the new current virtual hardware thread. If that current virtual hardware thread does not have a task assigned to it (e.g., typically only when a virtual hardware thread is first selected for execution by a logical processor), the software threading system executing on that virtual hardware thread then selects a task to assign to that virtual hardware thread. The logical processor then continues with the execution of the task assigned to the current virtual software thread. To access remote memory, that other task also invokes the software threading system, passing an indication of the memory location to access. The software threading system then repeats the process of issuing the remote memory access request, placing that virtual hardware thread in a wait state until that remote memory access completes, and selecting another virtual hardware thread for execution by the logical processor. If that selected virtual hardware thread is still waiting on a remote memory access to complete (e.g., based on checking for completion), the software threading system will then select another virtual hardware thread for execution. Alternatively, the software threading system may only select virtual hardware threads that are not waiting on a remote memory access to complete. If a virtual hardware thread is no longer waiting on a remote memory access, then the software threading system will select that virtual hardware thread for execution and continue its execution at the instruction after the remote memory access as indicated by the context that was saved for that virtual hardware thread. The software threading system will thus switch between virtual hardware threads (and their assigned tasks) when a remote memory access request is issued. As a result, the logical processor will continue to perform productive work (e.g., work of a task of the user program) while a virtual hardware thread is waiting for a remote memory access to complete. Because the software threading system in some embodiments requires only user privilege mode or another low privilege mode to switch between the virtual hardware threads, the software threading system avoids the overhead of a context switch to the operating system that may include saving and restoring contexts and switching to and from a kernel privilege mode or other high privilege modes.

In some embodiments, the software threading system provides support for synchronized access to a memory location, which may also be referred to as access to a synchronized memory location or synchronized access to a synchronized memory location. An example of synchronized access to a memory location is the "full/empty" synchronization model. With the "full/empty" synchronization model, a synchronized read from a memory location can only complete when that memory location is full and a synchronized write to a memory location can only complete when that memory location is empty. When a task performs a synchronized read from a memory location that is full, that memory location optionally becomes empty. When a task performs a synchronized write to a memory location that is empty, that memory location becomes full. If a task tries a synchronized read from a memory location that is empty or tries a synchronized write to a memory location that is full, the task cannot continue its execution until the memory location is placed in a desired state by another task writing to or reading from the memory location.

To perform a synchronized access to a memory location, a task, when its virtual hardware thread is selected for execution by a logical processor, invokes the software threading system, passing an indication of the memory location and the type of access (e.g., synchronized read or synchronized write). The software threading system determines whether the memory location is in the desired state and, if so, performs the memory access. If, however, the memory location is not in the desired state after a number of optional retries, then the software threading system designates that task as blocked on a synchronized access to that memory location. The software threading system then selects another task that is available to assign to that virtual hardware thread and starts execution of that task. A task is available when it is not already assigned to a virtual hardware thread and not blocked on a synchronized access to a memory location, or otherwise unable to execute. When a task eventually invokes the software threading system to access that memory location, the software threading system determines whether that memory location is in the desired state for that access. If in the desired state, the software threading system determines whether the state of that memory location will change as a result of the access (e.g., from full to empty). If so, then the software threading system may designate one or more tasks that are blocked on that memory location as now unblocked and thus available for execution. The software threading system then accesses that memory location as requested. If, however, that memory location is not in the desired state after a number of optional retries, the software threading system designates that task as blocked on a synchronized access to that memory location. Eventually, the software threading system will select a now unblocked task for assignment to a virtual hardware thread. The task will then attempt to access that memory location by invoking the software threading system. The software threading system will then again either allow the access if that memory location is in the desired state and unblock any blocked tasks or deny the access if that memory location is not in the desired state after a number of optional retries and block the task. The length of time that a task may be blocked on a synchronized access to a memory location may be significantly longer than a typical access time for a remote memory access. Thus, the software threading system unassigns a blocked task from the virtual hardware thread and attempts to assign an available task to that virtual hardware thread. Thus, a virtual hardware thread is freed up for assignment to another task. Alternatively, the software threading system may leave a blocked task assigned to its virtual hardware thread and simply select another virtual hardware thread for execution by the logical processor. With such an alternative, the software threading system would not re-select that virtual hardware thread for execution by the logical processor while the task is blocked or if re-selected, would execute code to determine that the assigned task is still blocked. In some embodiments, the software threading system may keep a task assigned to its virtual hardware thread even though the accessed memory location is not in the desired state until a number of unsuccessful retries (e.g., 3) to access the memory location. After that number of unsuccessful retries, the software threading system blocks the task and may then assign a different task to that virtual hardware thread as described above. The use of multiple retries may help avoid the overhead of blocking the task and assigning another task to that virtual hardware thread when the memory location may be very quickly put into the desired state.

In some embodiments, a compiler may be modified to support the software threading system. When a compiler compiles the code of a user program, the compiler may be able to detect whether a memory access is to local memory or remote memory. If the compiler detects that the memory access is to local memory, then the compiler can simply output one or more instructions to access that local memory. If the compiler detects that the memory access is to remote memory or cannot determine whether the memory access is to local memory or remote memory, then the compiler outputs code to invoke the software threading system to perform the remote access as appropriate. When the software threading system is invoked for such remote accesses, control is transferred to the software threading system so that it can assign another virtual hardware thread to the logical processor to perform productive work while the virtual hardware thread waits for the remote access to complete. A compiler may also detect when a memory access is to a synchronized memory location. In such a case, the compiler outputs code to invoke the software threading system, passing an indication of the access type and synchronized memory location. This invocation passes control to the software threading system so that it can perform the access to the synchronized memory location and optionally block the execution of the task and assign another task to the virtual hardware thread that is currently assigned to the processor. A programmer can also develop source code to explicitly invoke the software threading system for remote memory access, for synchronized memory access, or for other purposes as described below.

In some embodiments, when a user program is ready for execution, the software threading system, executing on a logical processor of a processor, requests the operating system to create a thread for each of the other processors of the same node, creates virtual hardware threads for each of the other logical processors, and starts the execution of the software threading system in the thread created by the operating system at each logical processor. Each logical processor is "allocated" its own set of virtual hardware threads, and the software threading system "selects for execution" by a logical processor only its own virtual hardware threads. The virtual hardware thread currently selected for execution by a logical processor is referred to as the "current virtual hardware thread" for that logical processor. The tasks that are currently assigned to the virtual hardware threads allocated to a logical processor are considered to be also currently assigned to that logical processor, and the task of the current virtual hardware thread that is currently selected for execution by a logical processor is considered to be the "current task" selected for execution by the logical processor. The software threading system executing at each logical processor may loop, selecting one of its own virtual hardware threads to execute next whenever a task assigned to one of its virtual hardware threads completes, initiates a remote memory reference, or blocks on a synchronized memory access. The software threading system executing at each logical processor may assign tasks to the virtual hardware threads allocated to that logical processor from a common pool of available tasks, which are not currently assigned to any virtual hardware thread. When a current task of the current virtual hardware thread selected for execution by a logical processor blocks (e.g., on a synchronized memory location), then the software threading system may un-assign the task from that current virtual hardware thread and assign to that current virtual hardware thread a task from the common pool. In this way, the execution of tasks is spread across the logical processors to be performed simultaneously by the different logical processors.

In contrast, each logical processor may execute the tasks assigned to its virtual hardware threads concurrently, but not simultaneously. Concurrent execution of tasks means that a single logical processor is only executing the instructions of a single task at a time, but can switch between executions of the instructions of different tasks such that multiple tasks assigned to its virtual hardware threads have had their execution started, but not yet completed.

Some MPP systems may not support the identification of the completion of specific remote memory accesses. These MPP systems may only identify when there are no more outstanding remote memory accesses for a specific processor or node. In such a case, if a processor issues remote memory access requests for multiple tasks in a short period of time, the execution of none of those tasks can resume until all of the remote memory accesses complete. In some embodiments, the software threading system may limit the number of remote memory access requests that can be issued before waiting for an indication that all the remote memory accesses have completed—that is, no more remote memory accesses are outstanding. By limiting the number of tasks that can have outstanding remote memory accesses, the software threading system can help ensure that not too many tasks wait even though their remote memory accesses have completed. For example, if the software threading system supports 32 virtual hardware threads per logical processor, the software threading system may limit the number of tasks that can have outstanding remote memory accesses for each logical processor to 8. The number of tasks that can have remote memory accesses outstanding can be selected to reduce the chances that no productive work can be done as a result of waiting for all the outstanding remote memory accesses to complete. This selection of the number of tasks may take into consideration the expected latency of the remote memory accesses, expected frequency of the remote memory accesses, dwell time (as described below), number of virtual hardware threads, and so on. In some embodiments, the software threading system may also decide to delay issuance of some remote memory access requests even though the limit has not been reached. For example, the software threading system may decide to delay issuance of a remote memory access request when all the currently outstanding remote memory accesses are expected to complete very soon. In such an embodiment, the software threading system may compare the time of issuance of the most recent remote memory access request to the expected latency of a remote memory access and delay issuance if the expected overlap in latency would be below a threshold overlap.

In some embodiments, the number of virtual hardware threads created for each logical processor may depend on the performance of the processors and the network interconnect. The number of virtual hardware threads may be determined based on the "dwell time" of the virtual hardware threads. The dwell time is the time it takes a virtual hardware thread to issue a remote memory access request plus the time it takes the software threading system to switch to the next virtual hardware thread. The smaller the dwell time, the more remote memory accesses can be outstanding at a time. If the rate of remote memory access requests reaches the maximum rate that the node can submit to the network interconnect, then all of the remote memory access latency is hidden. Principles of queueing theory (e.g., Little's Law) can be used to determine the number of virtual hardware threads to be created for each logical processor based on the average dwell time, the number of logical processors per processor, the number of processors per node, the maximum issuance rate of remote memory access requests, the average latency of a remote memory accesses, and so on.

FIG. 1 is a block diagram that illustrates an MPP system for executing a software threading system in some embodiments. The MPP system includes nodes 110, 120, 130, and 140 that are interconnected via a network interconnection 150. Node 110 includes one or more logical processors 111, a network interface controller 112, and local memory 115. The local memory includes an operating system 116, a software threading system 117, and a user program and data 118. Node 110 also can access as a remote memory local memories 125, 135, and 145 of the other nodes. The other nodes may include logical processors, network interface controllers, and software that are similar to that of node 110.

Figure 2:
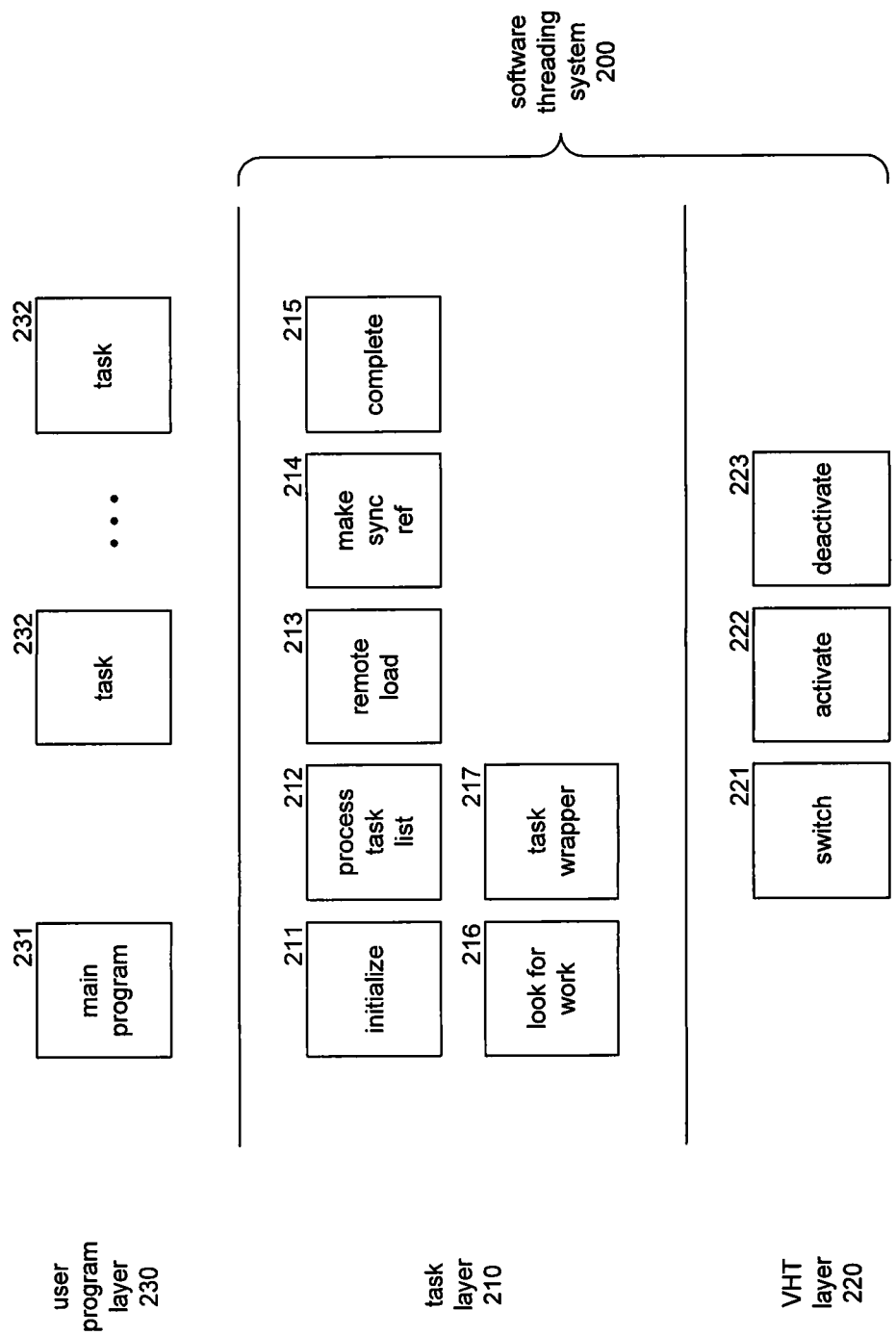
FIG. 2 is a block diagram that illustrates components of the software threading system in some embodiments.

FIG. 2 is a block diagram that illustrates components of the software threading system in some embodiments. The software threading system 200 includes a task layer 210 and a virtual hardware threading ("VHT") layer 220 that interact with a user program layer 230. The user program layer may comprise a typical parallel program that has a main program 231 and multiple tasks 232 that can execute in parallel. The user program invokes components of the task layer to effect the emulation of hardware threads in software. The task layer is responsible for assigning tasks of the user program to virtual hardware threads of the VHT layer for execution, processing remote memory accesses to place virtual hardware threads in a wait state, and processing synchronized memory accesses to place tasks in a blocked state as needed. The task layer includes an initialize component 211, a process task list component 212, a remote load component 213, a make synchronized reference component 214, and a complete component 215. These components of the task layer are invoked by the user program. The task layer also includes a look for work component 216 and a task wrapper component 217 that are invoked by the other components of the task layer. The VHT layer is responsible for selecting the virtual hardware thread to execute next and switch execution to the selected virtual hardware thread. The VHT layer also allows the task layer to activate and deactivate virtual hardware threads as described below. The VHT layer includes a switch component 221, an activate component 222, and a deactivate component 223 that are invoked by the task layer.

Figure 3:
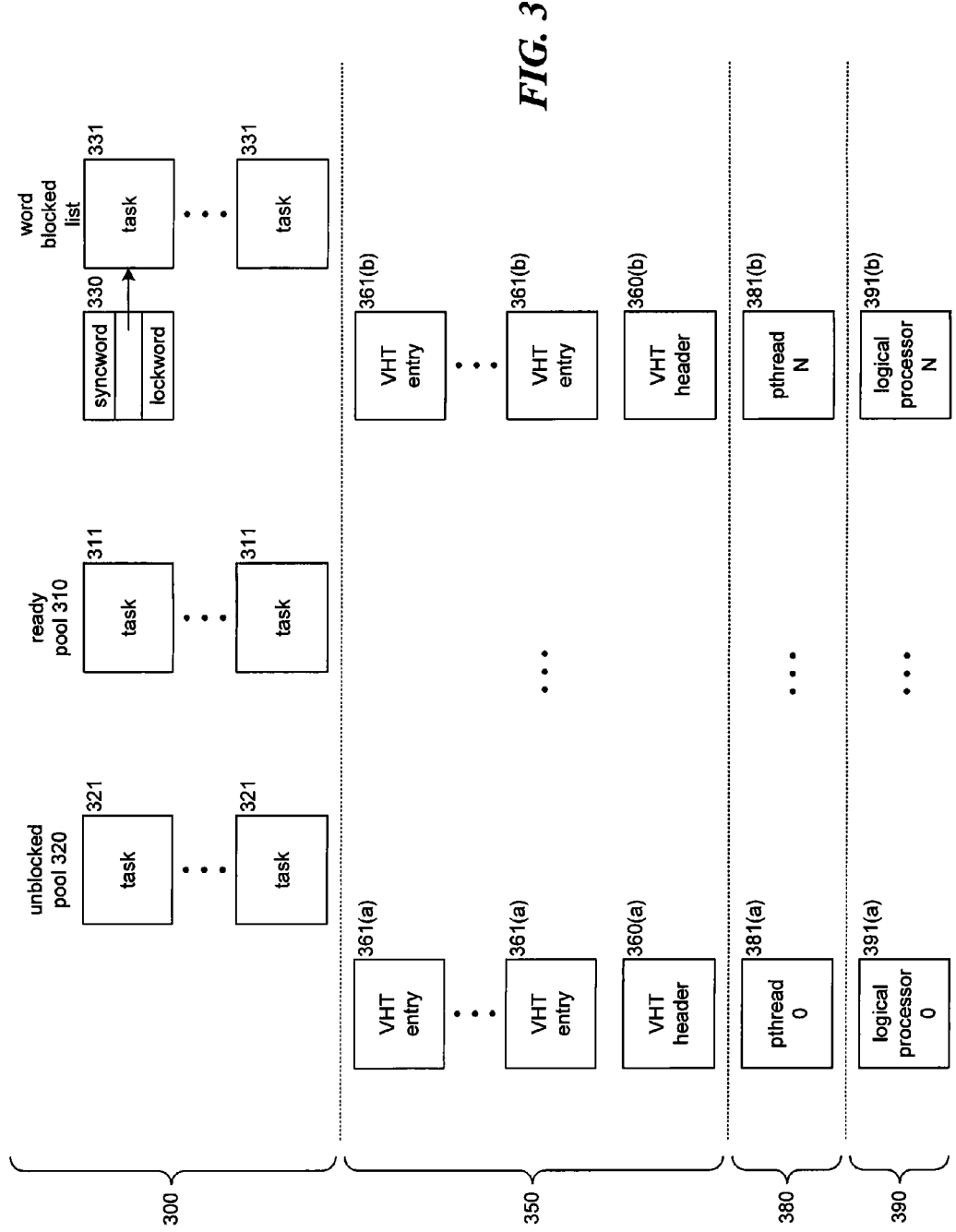
FIG. 3 is a block diagram that illustrates data structures of the software threading system in some embodiments.

FIG. 3 is a block diagram that illustrates data structures of the software threading system in some embodiments. The data structures are organized into task layer data structures 300, VHT layer data structures 350, and operating system data structures 380. FIG. 3 also illustrates the mapping of logical processors 390 to the data structures. The task layer data structures include a ready pool 310 and unblocked pool 320. The ready pool contains an entry 311 for each task that has been defined by a user program but has not yet started execution. The unblocked pool contains an entry for each task that was blocked on a synchronized memory access but is now unblocked and has not yet restarted its execution. The tasks in the ready pool and the unblocked pool are available to be assigned to a logical processor by assigning to a virtual hardware thread of that logical processor. The task layer data structures also include a synchronized word data structure 330 for each synchronized memory location. The synchronized word data structure includes a reference to a list of tasks 331 that are blocked awaiting synchronized access to that synchronized memory location. The synchronized word data structure may include a reference to the synchronized memory location and a lock word. The lock word allows the task layer executing on a logical processor to have exclusive access to the synchronized word so that its state can be checked and then a synchronized memory access performed without another logical processor changing the state between the checking and the accessing (e.g., a critical section).

The VHT layer data structures include a VHT header 360 for each logical processor and VHT entries 361 for each virtual hardware thread allocated to each logical processor. Each VHT entry contains the data for a virtual hardware thread allocated to a logical processor. The VHT header contains data common to the VHT entries. The operating system data structures includes a pthread data structure 381 that stores the state of the operating system thread that is currently executing on a logical processor 391. So, for example, logical processor 391(*a*) is currently assigned pthread data structure 381(*a*), which is allocated a VHT header 360(*a*) and VHT entries 361(*a*). In one embodiment, the task layer data structures are common to and accessed by each of the logical processors. To control access to the task layer data structures, the software threading system may use various synchronized access techniques such as those described in Mellor-Crummey, J. M. and Scott, M. L., "Algorithms for Scalable Synchronization on Shared-Memory Multiprocessors," ACM Trans. Comput. Syst. 9, No. 1, February 1991, p. 21-65, and in Michael, M. M. and Scott, M. L., "Simple, Fast, and Practical Non-Blocking and Blocking Concurrent Queue Algorithms," Proc. of the Fifteenth Annual ACM Symposium on Principles of Distributed Computing, 1996, p. 267-275, which are both hereby incorporated by reference. These synchronization techniques may include a lock-free technique for accessing a queue-based implementation of the pools and lightweight spin locks for access to a synchronized memory location.

Figure 4:
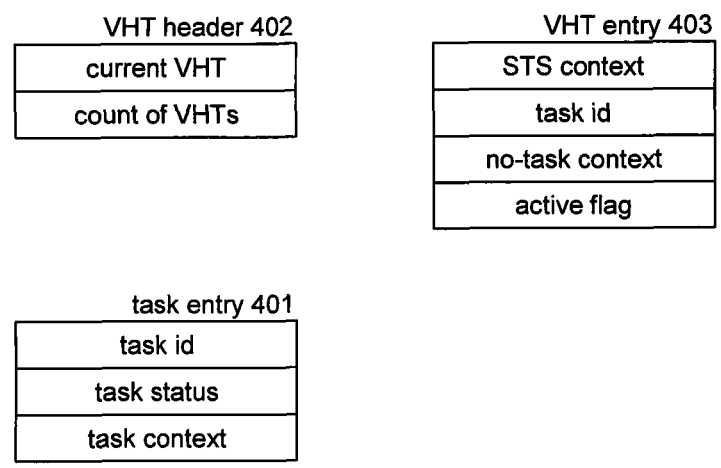
FIG. 4 is a block diagram that illustrates fields of various data structures of the software threading system in some embodiments.

FIG. 4 is a block diagram that illustrates fields of various data structures of the software threading system in some embodiments. A task entry 401 includes a task identifier, task status, and task context. The task status indicates the status of the task such as blocked, unblocked, ready, and so on. The task context stores the context of a task that is not currently assigned to a virtual hardware thread. The context of a task may include a pointer and a base for the stack of the task, a program counter of the task, and various registers of the task such as the callee-saved registers. The VHT header 402 contains a current VHT that identifies the current virtual hardware thread that is selected for execution by the logical processor and a count of the number of virtual hardware threads allocated to that logical processor. A VHT entry 403 contains a software threading system ("STS") context, a task identifier, a no-task context, and an active flag. The STS context contains the context for the software threading system while that virtual hardware thread is not selected for execution by the logical processor, either because it has been activated but has not yet run, or because it is waiting for a remote memory access to complete. The task identifier identifies the task that is currently assigned to that virtual hardware thread so that if the task blocks, the context of that task can be saved in the appropriate task entry while that task is not assigned to a virtual hardware thread. While the virtual hardware thread is assigned a task, the no-task context of the VHT entry contains the context of the virtual hardware thread itself, that is, the context it will use in order to look for another task to assign to that virtual hardware thread after the current task blocks or terminates. The active flag indicates whether that virtual hardware thread is currently active. The software threading system will only assign tasks to active virtual hardware threads.

Figure 5:
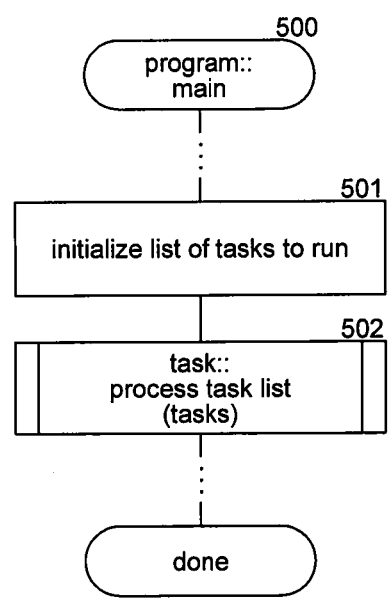
FIG. 5 is a flow diagram that illustrates example processing of a main routine of a user program that uses the software threading system in some embodiments.

FIG. 5 is a flow diagram that illustrates example processing of a main routine of a user program that uses the software threading system in some embodiments. The main routine 500 specifies to run a group of tasks in parallel. In block 501, the routine initializes a list of tasks to execute in parallel. For example, for each task, the list may identify the function or subroutine to execute for that task and a stack for that task. In block 502, the component invokes the process task list component of the task layer to execute the tasks in parallel. The process task list component returns when the execution of the tasks has completed.

Figure 6:
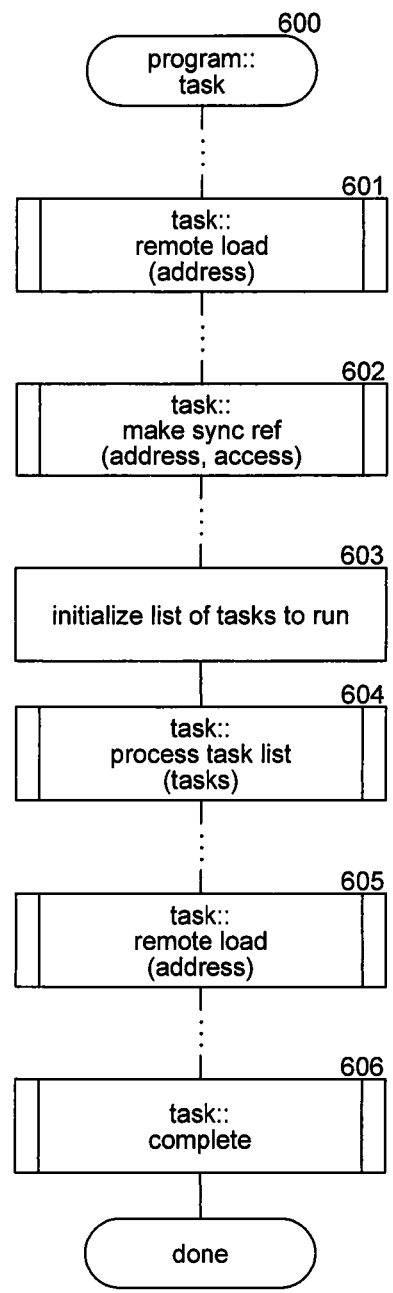
FIG. 6 is a flow diagram that illustrates the processing of a task function of a user program that uses the software threading system in some embodiments.

FIG. 6 is a flow diagram that illustrates the processing of a task function of a user program that uses the software threading system in some embodiments. The task function 600 accesses remote memory and synchronized memory locations. In block 601, the task function invokes the remote load component of the task layer, passing an address of the remote memory location to load. The remote load component returns when the remote memory access completes. In some embodiments, the software threading system supports selecting another virtual hardware thread for execution by the logical processor on remote load requests, but not on remote store requests. A task typically cannot continue productive execution without waiting for a remote load to complete. In contrast, a task typically can continue productive execution while waiting for a remote store to complete. In block 602, the task function invokes the make synchronized reference component of the task layer, passing the address of the synchronized memory location and the type of access. The component blocks the task if the synchronized memory location is not in the desired state after a number of optional retries. The component returns after the synchronized memory access completes. In block 603, the task function initializes a list of subtasks that are to run in parallel. In block 604, the task function invokes the process task list component of the task layer, passing an indication of the tasks to execute in parallel. The component returns when the execution of all the tasks has completed. In block 605, the task function invokes the remote load component of the task layer to access another remote memory location. In block 606, the task function invokes the complete component of the task layer to indicate that execution of the task has completed. This invocation of the complete function passes control to the software threading system so that another task can be assigned to the current virtual hardware thread to which the completed task was assigned.

Figure 7:
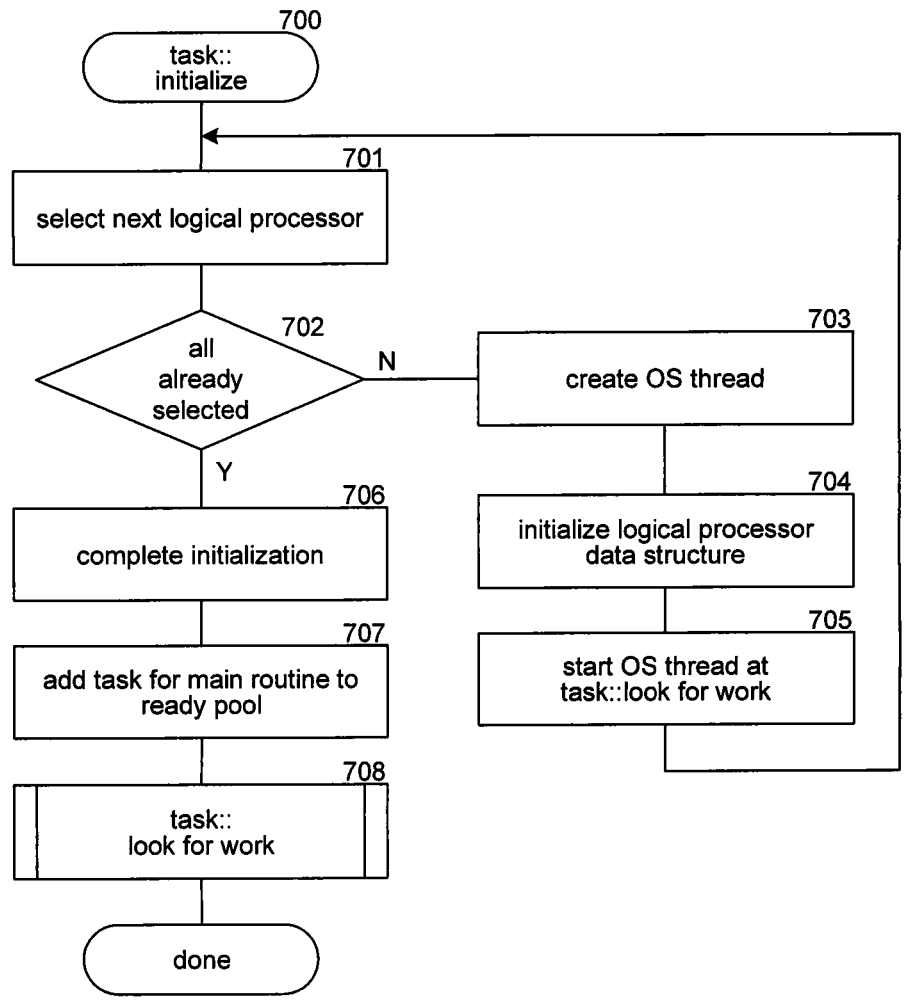
FIG. 7 is a flow diagram that illustrates the processing of an initialize task component of the task layer of the software threading system in some embodiments.

FIG. 7 is a flow diagram that illustrates the processing of an initialize task component of the task layer of the software threading system in some embodiments. The initialize component 700 may be invoked as part of initialization of a user program. The component initializes task layer data structures, creates an operating system thread for each logical processor (other than the one currently executing this component), and selects a virtual hardware thread for execution by each logical processor to execute the look for work component to find a task to assign to that virtual hardware thread. The component then adds a task for the main routine of the user program to the ready pool and executes the look for work component on the current virtual hardware thread. In blocks 701-705, the component loops, selecting each logical processor and starting the execution of a thread that is managed by the operating system for each logical processor. In block 701, the component selects the next logical processor. In decision block 702, if all the logical processors have already been selected, then the component continues at block 706, else the component continues at block 703. In block 703, the component requests the operating system to create a thread for the selected logical processor. In block 704, the component initializes the VHT layer data structures for the selected logical processor. In block 705, the component activates a virtual hardware thread for the selected logical processor and starts execution of the operating system thread at the look for work component of the task layer. The component then loops to block 701 to select the next logical processor. In block 706, the component completes the initialization including initializing the VHT layer data structures for the logical processor executing this component and establishing the execution of this component as a virtual hardware thread for the logical processor executing this component. In block 707, the component adds a task for the main routine of the user program to the ready pool. In block 708, the component invokes the look for work component of the task layer to start looking for work for the logical processor executing this component.

Figure 8:
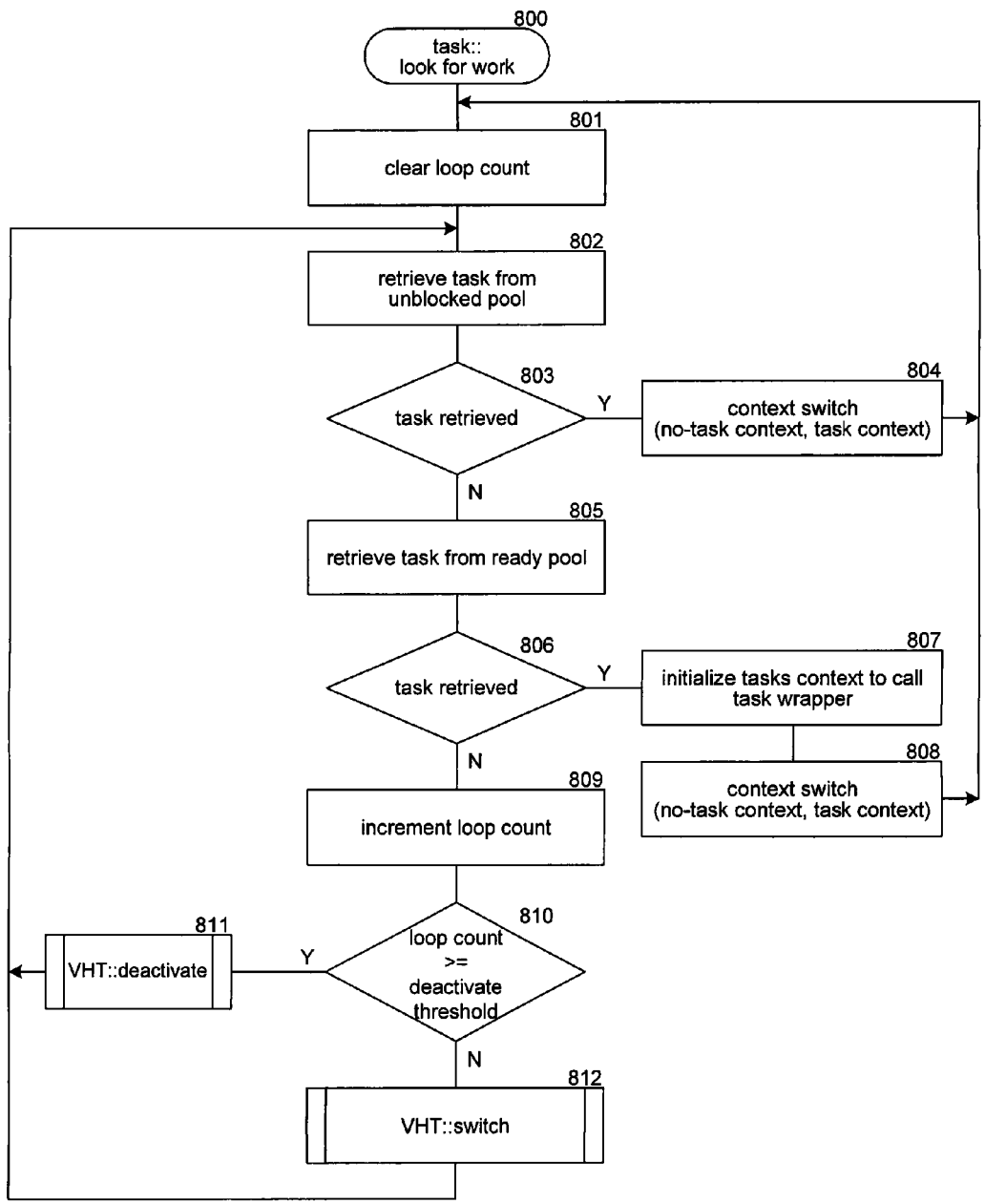
FIG. 8 is a flow diagram that illustrates the processing of a look for work component of the task layer of the software threading system in some embodiments.

FIG. 8 is a flow diagram that illustrates the processing of a look for work component of the task layer of the software threading system in some embodiments. The look for work component 800 is invoked to look for a task to assign to the current virtual hardware thread. If no task can be found to assign after a number of attempts, the component deactivates the current virtual hardware thread so that it is no longer executed by the logical processor. If there is a task in the unblocked pool, then the component assigns a task from the unblocked pool to the current virtual hardware thread. Otherwise, if there is a task in the ready pool, then the component assigns a task from the ready pool to the current virtual hardware thread—thus assigning the task to the logical processor. The component gives priority to tasks in the unblocked pool because the execution of those tasks has already started. In some embodiments, the component assigns a task that has been in their respective pools the longest. Thus, the component implements each pool as a queue. Alternatively, the component may assign the task from the unblocked pool that had been blocked for the longest. Such an alternative, however, would increase the overhead because of the tracking of the blocked times and identifying the task with the longest blocked time. One skilled in the art would appreciate that more sophisticated algorithms may be used to select a task from the unblocked pool or the ready pool based on well-known scheduling algorithms as used by operating systems to schedule threads or processes. If neither pool has a task, then the current virtual hardware thread selects another virtual hardware thread for execution by the logical processor. In block 801, the component clears a loop count that is used to track the number of times this virtual hardware thread has executed without finding a task in the pools. In block 802, the component attempts to retrieve a task from the unblocked pool. In decision block 803, if a task is retrieved from the unblocked pool, then the component continues at block 804, else the component continues at block 805. In block 804, the component switches the context of the logical processor from the task layer to the retrieved task by saving the current context of the logical processor in the no-task context and setting the current context of the logical processor to that of the retrieved task—thus assigning the retrieved task to the current virtual hardware thread. When the task blocks or terminates, the virtual hardware thread will switch back to the saved no-task context and execution of this component will loop to block 801. In block 805, the component attempts to retrieve a task from the ready pool. In decision block 806, if a task is retrieved from the ready pool, then the component continues at block 807, else the component continues at block 809. In block 807, the component initializes the task context in the VHT entry for the current virtual hardware thread to point to a task wrapper function of the task layer that encapsulates a task of the user program. In block 808, the component performs a context switch as described in block 804 to start execution of the task wrapper function. When the task blocks or terminates, the virtual hardware thread will switch back to the saved no-task context and execution of this component will loop to block 801. In block 809, the component increments the loop count to indicate the number of times that this virtual hardware thread could not find a task. In decision block 810, if the loop count is greater than or equal to a deactivate threshold (e.g., 3), then the component continues at block 811, else the component continues at block 812. In block 811, the component invokes the deactivate component of the VHT layer to deactivate the current virtual hardware thread and loops to block 802 to select another task for execution by this virtual hardware thread. If this virtual hardware thread is the last active virtual hardware thread that is allocated to the logical processor, then the current virtual hardware thread is not deactivated by the deactivate component (see the description of FIG. 16). In such a case, when the deactivate component returns, the component loops to select another task for execution by this virtual hardware thread. In block 812, the component invokes the switch component of the VHT layer. The switch component selects another virtual hardware thread for execution by the logical processor. When execution returns to this virtual hardware thread when the task is blocked or completes, execution loops to block 802 to assign another task to this virtual hardware thread.

Figure 9:
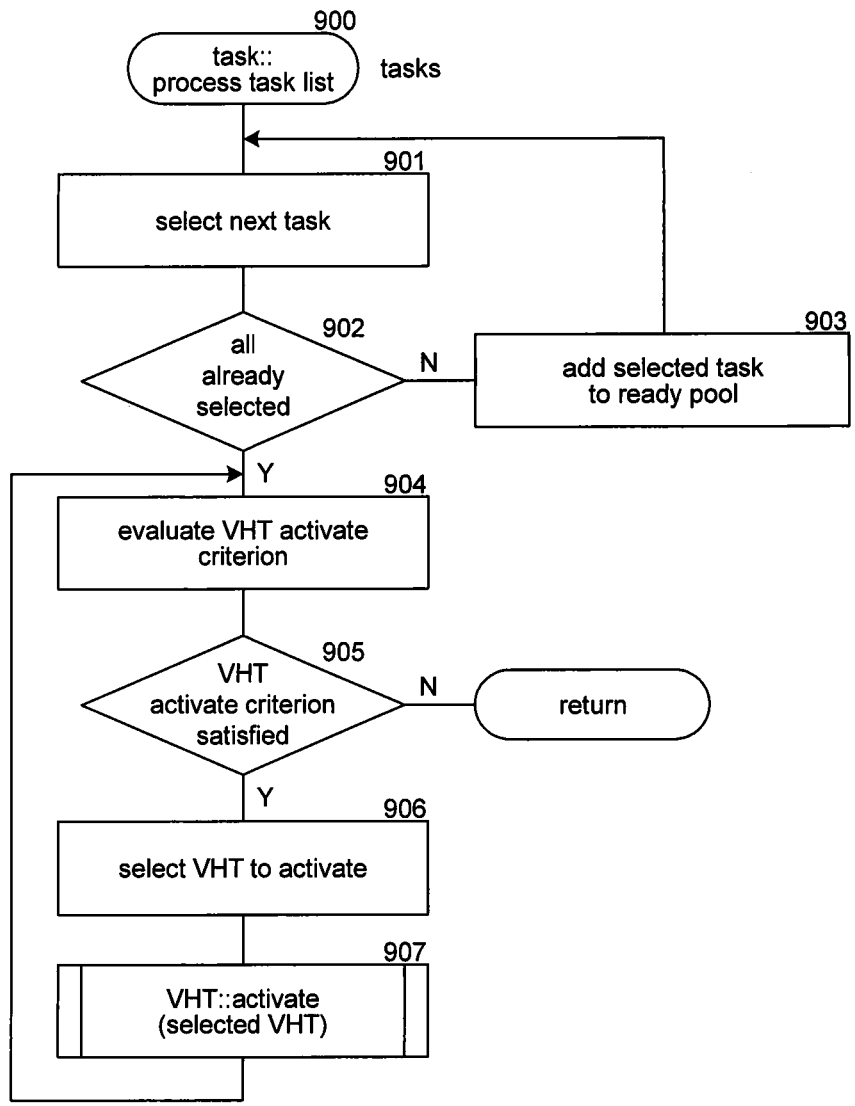
FIG. 9 is a flow diagram that illustrates the processing of a process task list component of the task layer of the software threading system in some embodiments.

FIG. 9 is a flow diagram that illustrates the processing of a process task list component of the task layer of the software threading system in some embodiments. The process task list component 900 is passed a list that defines tasks of the user program that may be executed in parallel. The component adds a task entry to the ready pool for each of the tasks and may activate virtual hardware threads. In block 901, the component selects the next passed task. In decision block 902, if all the passed tasks have already been selected, then the component continues at block 904, else the component continues at block 903. In block 903, the component adds the selected task to the ready pool and then loops to block 901 to select the next task. In block 904, the component evaluates a criterion for activating a virtual hardware thread. The criterion may specify that if less than the maximum number of virtual hardware threads for this logical processor are activated and there is a task in the ready pool, then the component activates a virtual hardware thread of this logical processor. Alternatively, the component may activate virtual hardware threads for other logical processors and may attempt to balance the number of activated virtual hardware threads across the logical processors and the logical processors of the node. In decision block 905, if the virtual hardware thread activation criterion is satisfied, then the component continues at block 906, else the component returns. In block 906, the component selects a virtual hardware thread to activate. In block 907, the component invokes the activate component of the VHT layer, passing an indication of the selected virtual hardware thread, and then loops to block 904 to reevaluate the criterion to determine whether an additional virtual hardware thread is to be activated.

Figure 10:
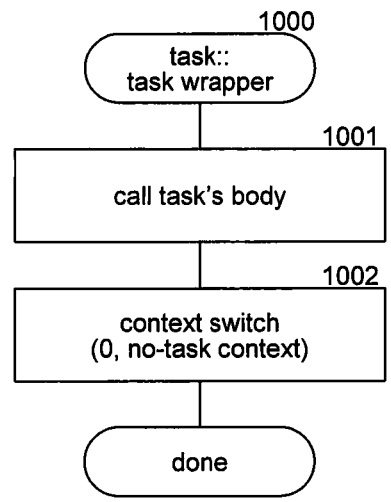
FIG. 10 is a flow diagram that illustrates the processing of a task wrapper of the task layer of the software threading system in some embodiments.

FIG. 10 is a flow diagram that illustrates the processing of a task wrapper of the task layer of the software threading system in some embodiments. The task wrapper component 1000 invokes the body of the task and upon completion performs a context switch back to the software threading system. In block 1001, the component invokes the function defined for the task by the user program. In block 1002, when the function returns, meaning the task is completed, then the component performs a context switch to the no-task context of the software threading system. This context switch resumes execution within the look for work component of the task layer.

Figure 11:
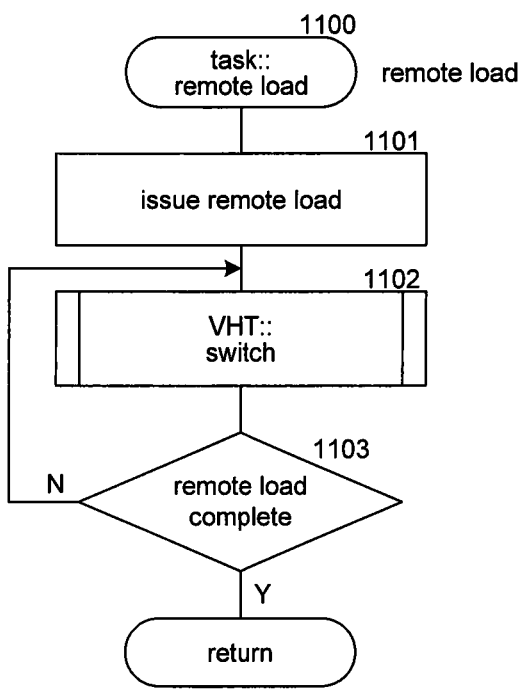
FIG. 11 is a flow diagram that illustrates the processing of a remote load component of the task layer of the software threading system in some embodiments.

FIG. 11 is a flow diagram that illustrates the processing of a remote load component of the task layer of the software threading system in some embodiments. The remote load component 1100 is passed an indication of the address of the remote load. In block 1101, the component issues the remote load. In block 1102, the component invokes the switch component of the VHT layer to switch execution of the logical processor to another virtual hardware thread. When execution is eventually switched back to this virtual hardware thread, execution continues at decision block 1103. In decision block 1103, if the remote load has completed, then the component returns, else the component loops to block 1102 to switch to another virtual hardware thread.

Figure 12:
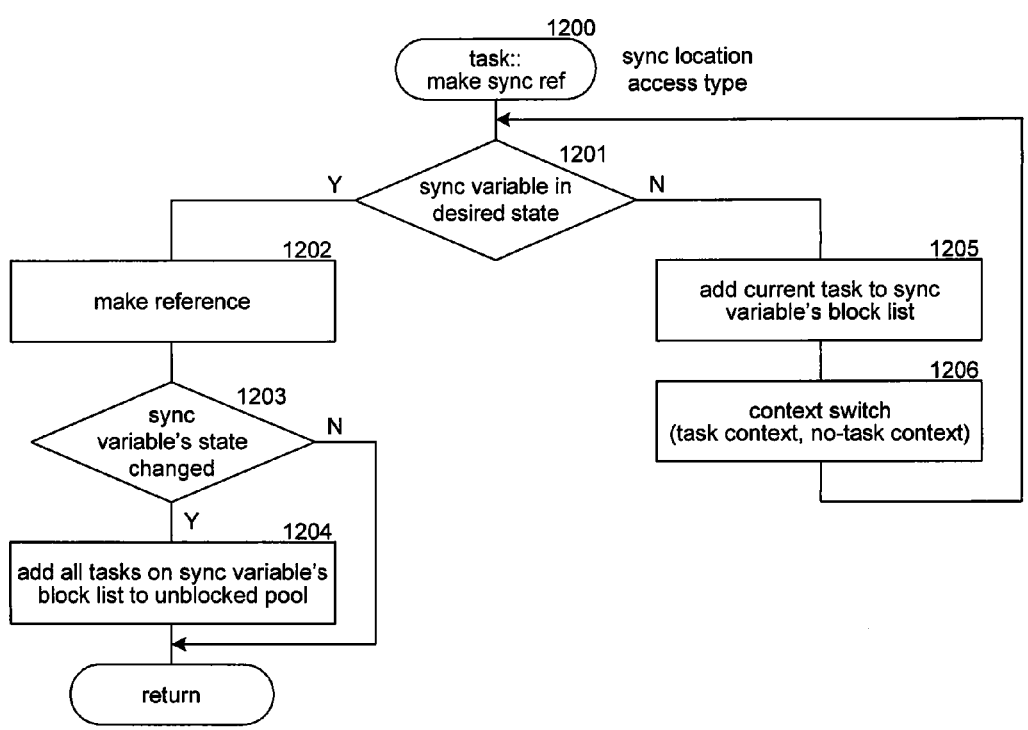
FIG. 12 is a flow diagram that illustrates the processing of a make synchronized reference component of the task layer of the software threading system in some embodiments.

FIG. 12 is a flow diagram that illustrates the processing of a make synchronized reference component of the task layer of the software threading system in some embodiments. The make synchronized reference component 1200 is passed an indication of a synchronized memory location and access type. The component blocks the executing task if the memory location is not in the desired state. Otherwise, the component performs the memory access and unblocks tasks that are blocked on that synchronized memory location. In the embodiment illustrated by FIG. 12, the component blocks the task as soon as the component determines that the synchronized memory location is not in the desired state without performing the optional retries as described above. In decision block 1201, if the memory location is in the desired state, then the component continues at block 1202, else the component continues at block 1205. Prior to checking whether the synchronized memory location is in the desired state, the component may lock the synchronization memory location to ensure exclusive access until after access to the synchronized memory location is complete or execution of this task is blocked. In block 1202, the component performs the requested memory access to the synchronized memory location and unlocks the synchronized memory location. In decision block 1203, if the state of the synchronized memory location has changed, then the component continues to block 1204, else the component returns. In block 1204, the component may unblock all the tasks that are blocked on that synchronized memory location by adding them to the unblocked pool and then returns. In some embodiments, the component may selectively unblock the tasks that are blocked on that synchronized memory location. For example, the component may unblock only one task or may unblock a certain number of tasks. The unblocking of only one task at a time may help avoid a race condition that may occur when multiple tasks are unblocked and a task that is unblocked happens to continually access the synchronized memory location after another task has already accessed that memory location and thus continually gets blocked again. The list of tasks that are blocked on a synchronized memory location may be maintained as a queue so that the task that has been blocked the longest is unblocked first. In block 1205, the component blocks the current task by adding its task entry to the blocked list of the synchronized memory location and then unlocks the synchronized memory location. In block 1206, the component then performs a context switch from the task context to the no-task context of the software threading system of the current virtual hardware thread. The software threading system then continues execution in the look for work component of the task layer. When the blocked task is eventually restarted, execution of that task will loop to decision block 1201 to check whether the synchronized memory location is now in the desired state. Alternatively, the virtual hardware thread that unblocks tasks may perform on behalf of a blocked task the synchronized memory references that caused the task to block. For example, if a task sets a synchronized memory location to full, then the virtual hardware thread executing that task performs a read to the synchronized memory location for the blocked task, which will set the synchronized memory location back to empty. The software threading system then saves the read value, for example, with the context of the blocked task and then unblocks the task. Such an alternative may help avoid the race condition described above in which a task executing at another logical processor accesses the synchronized memory location before the newly unblocked task. The software threading system may delay unlocking the synchronized memory location until after the access on behalf of the blocked task is complete. By keeping the synchronized memory location locked, the software threading system can ensure that the memory access for the blocked task is performed before the memory access for a task executing on another logical processor.

Figure 13:
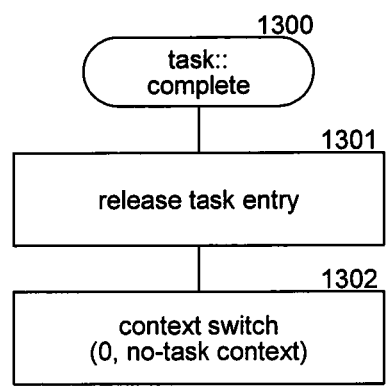
FIG. 13 is a flow diagram that illustrates the processing of a complete component of the task layer of the software threading system in some embodiments.

FIG. 13 is a flow diagram that illustrates the processing of a complete component of the task layer of the software threading system in some embodiments. The complete component 1300 is invoked when a task completes. In block 1301, the component releases the task entry that was allocated by the process task list component. In block 1302, the component performs a context switch to switch to the no-task context of the software threading system and continues executing at the look for work component of the task layer.

Figure 14:
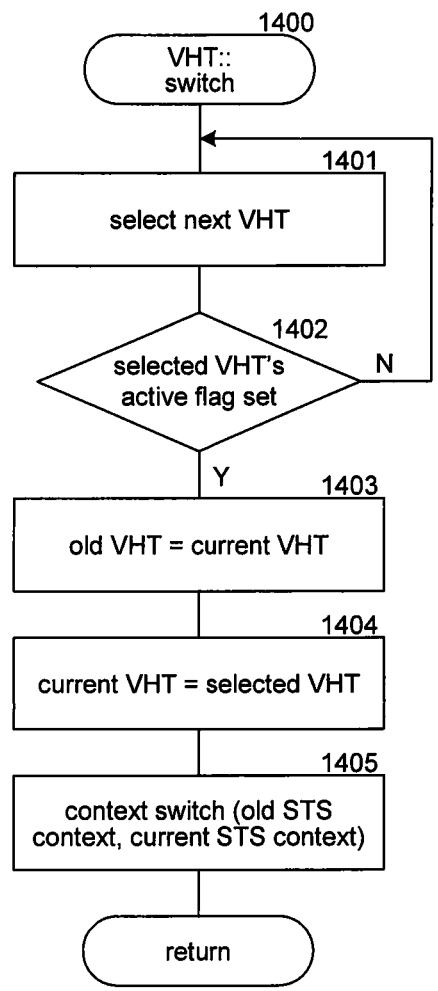
FIG. 14 is a flow diagram that illustrates the processing of a switch component of the VHT layer of the software threading system in some embodiments.

FIG. 14 is a flow diagram that illustrates the processing of a switch component of the VHT layer of the software threading system in some embodiments. The switch component 1400 is invoked whenever the software threading system is to switch execution of the logical processor to another virtual hardware thread. In block 1401, the component selects the next virtual hardware thread for execution by the logical processor. In decision block 1402, if the selected virtual hardware thread is active, then the component continues at block 1403, else the component loops to block 1401 to select the next virtual hardware thread. In block 1403, the component saves an indicator of the current virtual hardware thread. In block 1404, the component sets the current VHT in the VHT header to the selected virtual hardware thread. In block 1405, the component performs a context switch by saving the software threading system context of the previous-current virtual hardware thread and restoring the software threading system context of the now-current virtual hardware thread. The component then returns.

In some embodiments, the switch component may select the next virtual hardware thread to execute by traversing a list of the VHT entries in a round-robin manner. Alternatively, the switch component may use a more sophisticated algorithm but with a higher overhead to select the next virtual hardware thread to execute. For example, the switch component may select the thread whose task has gone the longest without executing. As discussed above, any of the well-known scheduling algorithms used by operating systems for scheduling threads and processes may be adapted for use in selecting the next virtual hardware thread to execute.

Figure 15:
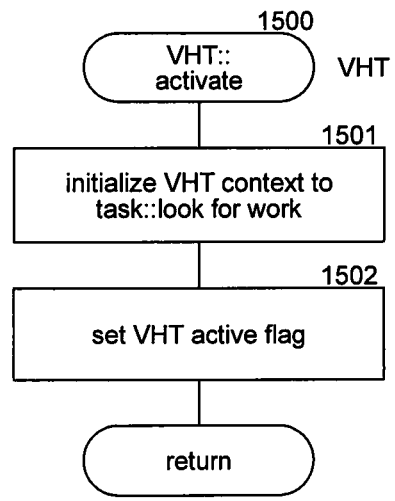
FIG. 15 is a flow diagram that illustrates the processing of the activate component of the VHT layer of the software threading system in some embodiments.

FIG. 15 is a flow diagram that illustrates the processing of the activate component of the VHT layer of the software threading system in some embodiments. The activate component 1500 is invoked to activate the passed virtual hardware thread. In block 1501, the component initializes the software threading content to start execution at the look for work component of the task layer. In block 1502, the component sets the active flag of the virtual hardware thread and then returns.

Figure 16:
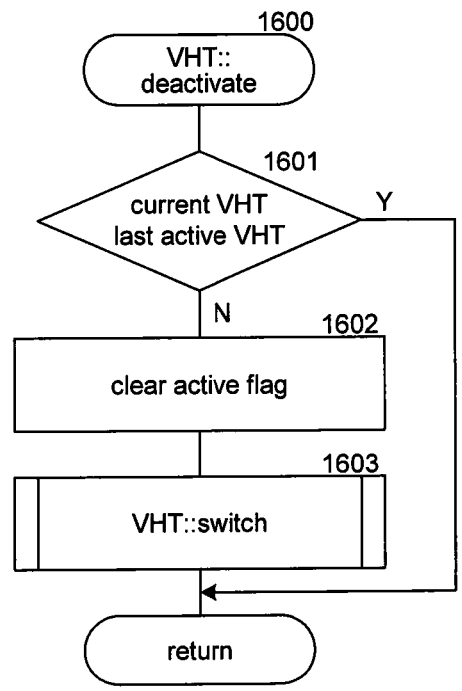
FIG. 16 is a flow diagram that illustrates the processing of the deactivate component of the VHT layer of the software threading system in some embodiments.

FIG. 16 is a flow diagram that illustrates the processing of the deactivate component of the VHT layer of the software threading system in some embodiments. The deactivate component 1600 is invoked to deactivate the current virtual hardware thread. If the current virtual hardware thread is the last active virtual hardware thread that is allocated to the logical processor, then the component does not deactivate the current virtual hardware thread because one virtual hardware thread needs to be active to look for an available task. In block 1601, if the passed virtual hardware thread is the last active virtual hardware thread allocated to the logical processor, then the component returns to look for an available task to assign to the current virtual hardware thread, else the component continues at block 1602. In block 1602, the component clears the active flag of the passed virtual hardware thread. In block 1603, the component invokes the switch component of the VHT layer to switch execution to another virtual hardware thread.

As described above, the software threading system may execute on nodes with processors and local memory and may include input devices (e.g., keyboard and pointing devices), output devices (e.g., display devices), and storage devices (e.g., disk drives). The memory and storage devices are computer-readable storage media or computer-readable storage devices that may be encoded with or store computer-executable instructions that implement the software threading system.

The software threading system is described in the general context of computer-executable instructions, such as program modules, executed by one or more processors. Generally, program modules include routines, programs, objects, components, data structures, functions, and so on that perform particular tasks or implement particular abstract data types. Typically, the functionality of the program modules may be combined or distributed as desired in various embodiments.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the software threading system may be implemented on a computer with a single processor and a multiple-level memory system in which the access times to the different levels vary. Such a computer may have a primary memory that stores instructions and some data and a secondary memory (with a slower access time than the primary memory) that stores additional data.

Also, a virtual hardware thread can be placed in a wait state for switchable service requests other than remote memory access requests. For example, a virtual hardware thread may be placed in a wait state when a task requests services of another hardware or software component (e.g., an encryption/decryption component, a compression component, or a component to perform another complex mathematical calculation). Also, the software threading system can block the execution of a task for "blockable service" requests other than for synchronized memory accesses. For example, a task may be blocked when the task requests to access memory or other storage with a relatively long latency, to wait on a message or other signal from another task, to acquire a lock, and so on. In general, blockable services may include any request that depends on execution of another task or has a long latency that would make it worthwhile to switch to another task.

Also, the software threading system may be adapted to share tasks between nodes. For example, if all the tasks assigned to a node have completed or if there are not a sufficient number of tasks assigned to a node to keep the processors of the node busy performing productive work, the software threading system may transfer tasks between nodes. The software threading system may select tasks to transfer to balance the overall work of the nodes and may factor in the anticipated remote memory access patterns of the tasks. For example, the software threading system may give preference to selecting tasks to transfer based on the expected change in latency of the remote memory access requests of the tasks after the transfer. The software threading system may select to transfer a task whose latency is expected to decrease rather than selecting a task whose latency is expected to increase as a result of the transfer.

Also, the software threading system may allocate virtual hardware threads to be shared by a processor that has multiple logical processors. In such a case, the software threading system executing on a logical processor selects a virtual hardware thread for execution by the logical processor from the shared virtual hardware threads. With such sharing, the software threading system may need to ensure that each logical processor has exclusive access to the VHT data structures (e.g., VHT header and VTH entries) when selecting a virtual hardware thread for execution.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a processing node for executing multiple tasks concurrently, the processing node having a logical processor and access to local memory and remote memory, the logical processor for executing instructions of an instruction set of an actual processor of the processing node, the method comprising:
   providing a program having multiple tasks that may be executed in parallel, the tasks for performing functionality that includes accessing remote memory;
   executing by the logical processor instructions of a task of the program in a first privilege mode; and
      when the task is to access remote memory and while remaining in the first privilege mode, executing by the logical processor one or more instructions to transfer control from the task to a software threading system; and under control of the software threading system:
      executing by the logical processor one or more instructions to issue a remote memory access request;
      executing by the logical processor one or more instructions to designate the task as waiting on the issued remote memory access request;
      executing by the logical processor one or more instructions to select another task that is not waiting on an issued remote memory access request for execution while the task is waiting for the remote memory access request to complete;
      executing by the logical processor one or more instructions to switch execution to the other task that is not waiting on an issued remote memory access request; and
      executing by the logical processor instructions of the other task that is not waiting on an issued remote memory access request,
   such that the logical processor executes instructions to switch execution to the other task that is not waiting after the currently executing task is designated as waiting to effect the executing of multiple tasks concurrently by the logical processor without switching from the first privilege mode to a second privilege mode.

2. The method of claim 1 wherein the first privilege mode is in a user privilege mode.

3. The method of claim 1 wherein the second privilege mode is a privilege mode for executing kernel of an operating system.

4. The method of claim 1 wherein the node has multiple logical processors, each logical processor is assigned multiple tasks, and each logical processor executes one or more instructions to select a next task for execution by that logical processor from the tasks that are assigned to that logical processor.

5. The method of claim 4 wherein a task stays assigned to the same logical processor when the task issues a remote memory access request.

6. The method of claim 4 wherein a task is unassigned from its assigned logical processor when the task blocks on a synchronized memory access.

7. The method of claim 4 wherein a task assigned to each logical processor is selected from a pool of available tasks that are shared by the logical processors.

8. The method of claim 7 wherein a logical processor that changes the state of a synchronized memory location executes one or more instructions to add a task previously blocked on that synchronized memory location to a pool of unblocked tasks.

9. The method of claim 4 including allocating data structures for storing task context while a task is waiting and storing a software threading system context while the task is executing.

10. The method of claim 1 wherein when access to remote memory provides an indication that there are no outstanding remote memory access requests rather than an indication that individual remote memory access requests have completed, the logical processor limits the number of outstanding remote memory access requests.

11. The method of claim 10 wherein in response to the indication that there are no more outstanding remote memory access requests, designating each task that is currently waiting on a remote memory access requests as not waiting.

12. The method of claim 1 wherein the logical processor executes one or more instructions to detect when each specific remote memory access request completes and to designate the task waiting on the completed remote memory access as not waiting.

13. The method of claim 1 wherein code to transfer control to the software threading system is added to the program by a compiler that automatically detects the access to remote memory.

14. The method of claim 13 wherein code to transfer control to software threading system is added to the program by a compiler that cannot determine whether the access is to local memory.

15. The method of claim 13 wherein code to transfer control to the software threading system is added to the program by a programmer.

16. A computer-readable memory that is not a transitory, propagating signal, the computer-readable memory containing computer-executable instructions for emulating on a processing node simultaneous execution of tasks by multiple hardware threads using virtual hardware threads, the processing node having a logical processor for executing instructions of an instruction set, an operating system and access to local memory and remote memory, the tasks for performing functionality that includes accessing remote memory, the computer-executable instructions of the instruction set comprising:
instructions that initialize a data structure for each virtual hardware thread for storing context of a task assigned to that virtual hardware thread while the logical processor is executing another virtual hardware thread;
instructions that initialize the virtual hardware threads so that each of their data structures identify code that assigns a task to the virtual hardware thread;
instructions that start execution by the logical processor of an initialized virtual hardware thread as a current virtual hardware thread, so that the current virtual hardware thread assigns a task to the current virtual hardware thread and starts execution of the assigned task in a first privilege mode; and
instructions that when the current virtual hardware thread is to access remote memory and while remaining in the first privilege mode, transfer by the logical processor control from the task to a software threading system; and
under control of the software threading system:
initiate the remote memory access by issuing a remote memory access request;
designate the current virtual hardware thread as waiting for the requested remote memory access to complete;
select another virtual hardware thread with a task that is not waiting on an issued remote memory access request; and
switch execution of the logical processor to the other virtual hardware thread for executing the task that is not waiting on a remote memory access to complete,
so that the logical processor switches between virtual hardware threads to continue execution of other tasks while a task waits for a remote memory access to complete.

17. The computer-readable memory of claim 16 wherein the tasks comprise portions of a program that can be executed in parallel.

18. The computer-readable memory of claim 16 wherein the instructions that switch the execution of virtual hardware threads are performed while in a user privilege mode.

19. The computer-readable memory of claim 16 wherein the processing node has at least two logical processors with access to local memory and each logical processor executes instructions to select a next task to assign to a virtual hardware thread allocated to that logical processor from a pool of tasks that are not currently assigned to a virtual hardware thread.

20. The computer-readable memory of claim 19 wherein the assignment of a task to a virtual hardware thread does not change as a result of the task issuing a remote memory access request or as a result of completion of the remote memory access request.

21. The computer-readable memory of claim 19 wherein the assignment of a task to a virtual hardware thread changes as a result of the task blocking on a synchronized memory access.

22. A computer system comprising:
a plurality of logical processors for executing instructions of an instruction set and having access to local memory and remote memory; and
a local memory storing computer-executable instructions of the instruction set, the instructions comprising:
a task layer that includes:
an initialize component having instructions that, when executed by a logical processor requests an operating system to create a thread for each other logical processor, allocate virtual hardware threads, start each created thread executing a look for work component of a current virtual hardware thread, add a task for a main function of a program to a pool of tasks, and start execution of the look for work component;
the look for work component having instructions that, when executed by that logical processor executing instructions of the current virtual hardware thread in a first privilege mode, when a task is in the pool of tasks, assigns a task from the pool to the current virtual hardware thread, and when a task is not in the pool, selects for execution by that logical processor another virtual hardware thread; and a remote load component having instructions that, when executed by that logical processor executing instructions of the current virtual hardware thread to initiate a remote load and while remaining in the first privilege mode, transfers control to a software threading system that initiates a remote load and starts execution of a switch component to select another virtual hardware thread for execution by that logical processor without switching privilege modes while the current hardware thread is waiting; and a virtual hardware thread layer that includes:

a switch component having instructions that, when executed by a logical processor executing instructions of the current virtual hardware thread, select another virtual hardware thread that is not waiting on a remote load and switch execution from the current virtual hardware thread to the other virtual hardware thread without switching privilege modes.

23. The computer system of claim 22 wherein the task layer and the thread layer execute in a user privilege mode.

24. The computer system of claim 22 wherein the task layer includes a process task list component that, when executed by that logical processor executing instructions of the current virtual hardware thread, adds tasks of the program to the pool.

25. A method in a processing node for executing multiple tasks, the processing node having a logical processor and access to remote memory, the logical processor having an instruction set, the tasks having instructions of the instruction set, the method comprising:

selecting one of the tasks for execution by the logical processor, the selected task for accessing the remote memory such that after the task requests to access the remote memory, the access needs to complete before the task can continue execution;

during execution by the logical processor of the selected task in a first privilege mode, when the selected task is to access the remote memory and while remaining in the first privilege mode, executing by the logical processor one or more instructions to transfer control from the selected task to a software threading system; and under control of the software threading system in the first privilege mode:

executing one or more instructions for initiating access to the remote memory, the one or more instructions completing execution before the remote memory access completes; and executing one or more instructions to designate the selected task as waiting for the remote memory access to complete, to select another task that is not waiting on a remote memory access for execution by the logical processor while the waiting task waits for the remote memory access to complete, and to switch execution to the other task so that the other task executes while the waiting task waits for the remote memory access to complete.

* * * * *